Feb. 24, 1942.  E. S. SMITH  2,273,904
ELECTRIC HEATING APPARATUS
Filed Sept. 18, 1940
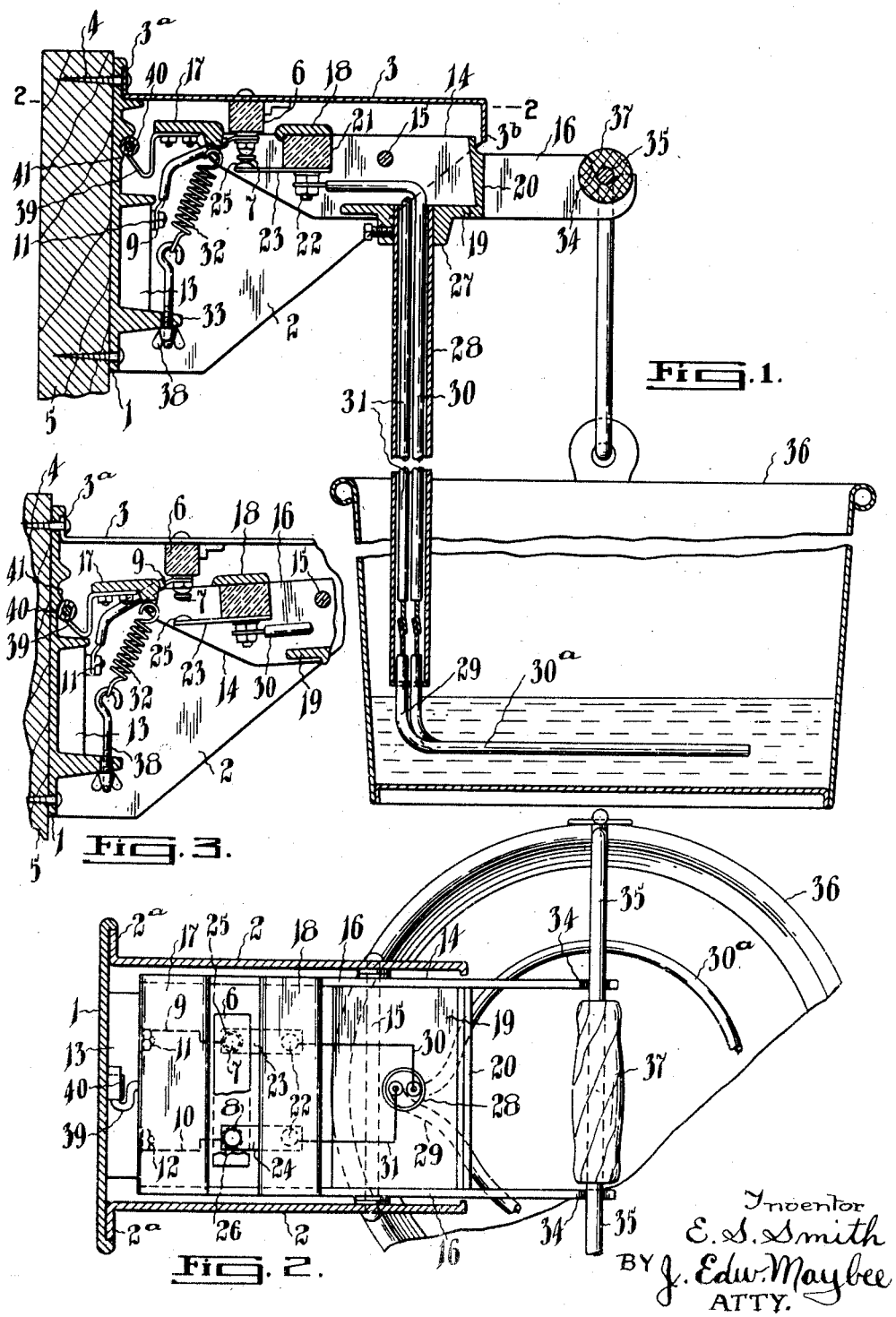

Patented Feb. 24, 1942

2,273,904

UNITED STATES PATENT OFFICE 2,273,904

ELECTRIC HEATING APPARATUS

Elmore Stanley Smith, Weston, Ontario, Canada, assignor to Moffats Limited, Weston, Ontario, Canada Application September 18, 1940, Serial No. 357,255
In Canada May 20, 1940

8 Claims. (Cl. 219—41)

The present invention relates to electric heating apparatus of the type adapted to heat the contents of a pail or other similar vessel. Heretofore, it has been necessary for farmers and poultrymen to carry pails of hot water from farm house stoves to the barns and poultry houses to enable warm food to be fed to stock and poultry. The object of this invention is to provide a safe and economical device for heating liquid or food containing liquid in a barn or poultry house. A further object is to devise apparatus of this character in which the heating element is connected with and disconnected from a source of electric supply by the action of positioning a pail on a part of the apparatus and removing it therefrom respectively, in which the connections for energizing the heating element are so positioned that live connections cannot be contacted accidentally by an operator or by inflammable material, and in which the electric energy will be automatically disconnected before the pail becomes dry.

I attain my objects by providing a pivoted arm with a heating element adapted to heat the contents of a container when the latter is supported on the arm. A switch electrically connected with the heating element is adapted to be connected in an electric supply circuit and is operated by the rocking of the arm to open and close the switch. Means is provided to turn the arm on its pivot to cause the switch to be opened to de-energize the heating element when the weight of the container and its contents is less than a predetermined amount.

The constructions are hereinafter more fully described and are illustrated in the accompanying drawing in which Fig. 1 is a vertical section of the apparatus;

Fig. 2 a horizontal section on the line 2—2 in Fig. 1, the pail and heating element being partly broken away; and Fig. 3 a sectional detail showing the contacts disengaged.

In the drawing like numerals of reference indicate the corresponding parts in the different figures.

The apparatus includes a bracket having an end 1 and spaced apart side members 2 connected with the said end. The side members 2 may be formed integral with a top or cover portion 3 and the said parts 2 and 3 may have flanges 2ª and 3ª for securing them to the end or base plate 1. Screws 4 are employed to secure the bracket to any suitable part 5, such as a post, of a barn or chicken-house.

Secured to the underside of the cover portion 3 is an insulating block 6 on the underside of which are mounted the fixed contacts 7, 8. These contacts are connected by leads 9, 10 with terminals 11, 12 on an insulating block 13 which is secured to the end 1 of the bracket beneath the cover portion 3. To the terminals are connected lead-in wires (not shown) for supplying energy to said terminals and thus to the fixed contacts 7 and 8.

An arm 14 pivoted at 15 on the bracket side members 2 is formed of two side parts 16 which are connected together by a plurality of cross bars, 17, 18, 19 and 20. The bar 18 carries an insulating block 21 to which are secured, by means of bolts 22, the resilient conductors 23, 24. These conductors carry contacts 25, 26 adapted to engage the fixed contacts 7, 8. The cross bar 19 is provided with a boss 27 having an opening therethrough to receive the upper end of the tube 28 which depends from the arm. In the lower end of the tube is suitably secured the ends of a sheathed type of heating element 29 having convolutions 30ª extending laterally of the tube. The terminals of the element 29 are electrically connected with the conductors 23, 24 and thus with the contacts 25, 26 by means of insulated wires 30, 31. These wires are suitably secured to the element terminals within the tube 28 and pass through the upper end thereof for connection with the bolts 22. The lower end of the tube is closed around the projecting ends of the sheathed element to prevent moisture from entering the tube. The upper end of the tube is engaged by a set screw which is threaded in the boss 27 to secure the tube in position therein. A spring 32 connected with the cross-bar 17 of the arm 14 and a lug 33 on the end 1 of the bracket tends to turn the arm on its pivot 15 to cause the contacts 25, 26 to be moved out of engagement with the fixed contacts 7, 8 whereby the heating element 29 is normally de-energized.

The free end of the pivoted arm 14 projects beyond the cover portion 3 of the bracket, and the side parts 16 of the arm are provided with notches or open bearings 34 to receive the bail 35 of a pail 36. The said parts 16 are spaced apart sufficiently to permit the usual wooden handle 37 on the bail 35 to be positioned between them which facilitates the removal of the pail from the arm after the water or food in the pail has been heated by the element 29. The latter is immersed in the pail as it is being moved upwardly to hang its bail on the arm 14.

The tension of the spring 32 which may be varied by an adjusting screw 38 interposed between the lug 33 and the adjacent end of the spring, is such that it will move the arm to deenergize the heating element 29 before the pail boils dry. That is to say, the spring will cause the contacts to be separated when the weight of the pail 36 and its contents is less than a predetermined amount. The crossbar 20 is adapted to engage a depending lip 3ᵇ on the cover portion 3 to limit the movement of the arm 14 under the action of the spring 32. The latter forms a resilient stop for the arm when it is carrying a pail having sufficient contacts to overcome the tension of the spring. Thus most of the load is removed from the contacts and the conductors 23, 24.

To eliminate arcing, the contacts 25, 26 are sharply engaged with and disengaged from the fixed contacts 7, 8. The arm 14 carries a spring finger 39 having an anti-friction roller 40 which is adapted to ride over a projection or hump 41 on the adjacent face of the end 1 of the bracket. The roller tends to remain at the upper side of the projection until the spring 32 is tensioned sufficiently to draw the roller quickly over the projection whereupon the arm 14 is correspondingly moved to disengage the contacts. The roller then tends to remain at the lower side of the projection 41 until sufficient weight is applied to the free end of the arm 14 to overcome the resistance and cause the movable contacts to engage the fixed contacts quickly.

From the above description, it is obvious that the heating element 29 is energized only when a pail carrying sufficient liquid to overcome the tension of the spring 32 is hung on the arm 14. If the operator should forget to remove the paid when its contents reaches the desired temperature the contents will boil away until the spring 32 automatically turns the arm on its pivot to cause the contacts to be separated and thus the heating element to be de-energized. This occurs before the element is uncovered by the liquid in the pail so that any dust or dirt cannot contact the element while it is being energized. The side members 2 and cover portion 3 enclose the contacts and the other electrical connections whereby they cannot be accidentally contacted by the operator or by any straw, etc., which might be blown towards the apparatus. The latter is conveniently positioned for use above the floor of the barn or chickenhouse and thus away from any straw on the floor and out of reach of small animals.

What I claim as my invention is:

1. Electric heating apparatus comprising an arm pivoted on a stationary part; a switch for connection with an electric supply circuit operable by the rocking of the arm for opening and closing the switch; a heating element carried by the arm and electrically connected with the switch, the element being adapted to heat the contents of a container when the latter is supported on the arm; means tending to turn the arm on its pivot to cause the switch to be opened when the weight of the container and contents is less than a predetermined amount; a stationary projection; and a spring finger carried by the arm and adapted to ride over the projection when the arm is rocked in either direction of rotation to ensure a sharp opening and closing of the switch.

2. Electric heating apparatus comprising a stationary bracket; an arm pivoted on said bracket; a switch for connection with an electric supply circuit operable by the rocking of the arm for opening and closing the switch; an immersion heating element secured to and depending from said arm, the element being electrically connected with the switch and being adapted to be received in a pail when the latter is hung on the arm; a spring tending to turn the arm on its pivot to cause the switch to be opened; a projection on the bracket; and a spring finger carried by the arm and adapted to ride over the projection when the arm is turned in either direction of rotation to ensure a sharp opening and closing of the switch.

3. Electric heating apparatus comprising a stationary bracket having spaced apart side members; fixed contacts connected with a source of electric supply and carried by the bracket between the side members; an arm pivoted on said side members and comprising two spaced apart side parts having open bearings to receive a bail on a pail; contacts on said arm adapted to engage the fixed contacts; a heating element secured to and depending from the arm, the element being electrically connected with the contacts on the arm and being adapted to be received in the pail; and a spring tending to turn the arm on its pivot to cause the second mentioned contacts to be moved out of engagement with the fixed contacts.

4. Electric heating apparatus comprising a stationary bracket having spaced apart side members, and an end member connected with said side members; fixed contacts connected with a source of electric supply and carried by the bracket between the side members; an arm pivoted on said side members and comprising two spaced apart side parts having open bearings to receive a bail on a pail; contacts on said arm adapted to engage the fixed contacts; a heating element secured to and depending from the arm, the element being electrically connected with the contacts on the arm and being adapted to be received in the pail; a spring tending to turn the arm on its pivot to cause the second mentioned contacts to be moved out of engagement with the fixed contacts; a projection on the end member; a spring finger having one end secured to the arm; and an anti-friction roller journalled on the other end of the finger adapted to ride over the projection when the arm is turned in either direction of rotation to ensure a sharp engagement and separation of the arm contacts with and from the fixed contacts.

5. Electric heating apparatus comprising a stationary bracket; fixed contacts connected with a source of electric supply and carried by said bracket; an arm pivoted on said bracket and having an open bearing to receive a bail on a pail; resilient connectors carried by and insulated from said arm; contacts on said connectors adapted to engage the fixed contacts; a heating element secured to and depending from said arm, the element being electrically connected with the connectors on the arm and being adapted to be received in the pail; and a spring tending to turn the arm on its pivot to cause the second mentioned contacts to be moved out of engagement with the fixed contacts.

6. Electric heating apparatus comprising a stationary bracket having spaced apart side members, an end member with which said side members are connected, and a cover portion connected with the side members; an insulating block secured to the underside of the cover; fixed contacts connected with a source of electric supply and carried on the underside of said block; an arm pivoted on said side members and comprising two sapced apart side parts having open bearings to receive a bail on a pail; resilient connectors carried by and insulated from said arm; contacts on said connectors adapted to engage the fixed contacts; an immersion heating element of the sheathed type secured to and depending from the arm, the element being electrically connected with the connectors and being adapted to be received in the pail; and a spring tending to turn the arm on its pivot to cause the second mentioned contacts to be moved out of engagement with the fixed contacts.

7. Electric heating apparatus comprising a stationary bracket having spaced apart side members; fixed contacts connected with a source of electric supply and carried by the bracket between the side members; an arm pivoted on said side members and comprising two spaced apart side parts having open bearings to receive a bail on a pail; contacts on said arm adapted to engage the fixed contacts; a cross bar on the arm connecting the two side parts and provided with an opening; a tube secured in said opening and depending from the cross-bar; a heating element of the sheathed type secured in the lower end of said tube and projecting therefrom for immersion in the pail, the element being electrically connected with the contacts on the arm; and means tending to turn the arm on its pivot to cause the second mentioned contacts to be moved out of engagement with the fixed contacts.

8. Electric heating apparatus comprising a stationary bracket having spaced apart side members; fixed contacts connected with a source of electric supply and carried by the bracket between the side members; an arm pivoted on said side members and comprising two spaced apart side parts having open bearings to receive a bail on a pail; contacts on said arm adapted to engage the fixed contacts; a heating element secured to and depending from the arm, the element being electrically connected with the contacts on the arm and being adapted to be received in the pail; a spring tending to turn the arm on its pivot to cause the second mentioned contacts to be moved out of engagement with the fixed contacts; a projection on the bracket; and a spring finger carried by the arm and adapted to ride over the projection when the arm is turned in either direction of rotation to ensure a sharp opening and closing of the switch.

ELMORE S. SMITH.